(12) United States Patent
Yan et al.

(10) Patent No.: US 11,158,071 B2
(45) Date of Patent: Oct. 26, 2021

(54) METHOD AND APPARATUS FOR POINT CLOUD REGISTRATION, AND COMPUTER READABLE MEDIUM

(71) Applicant: BAIDU ONLINE NETWORK TECHNOLOGY (BEIJING) CO., LTD., Beijing (CN)

(72) Inventors: Miao Yan, Beijing (CN); Zixiang Zhou, Beijing (CN); Pan Luo, Beijing (CN); Yu Bai, Beijing (CN); Changjie Ma, Beijing (CN); Dangen She, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/823,288

(22) Filed: Mar. 18, 2020

(65) Prior Publication Data
US 2020/0342614 A1 Oct. 29, 2020

(30) Foreign Application Priority Data
Apr. 24, 2019 (CN) .......................... 201910334541.0

(51) Int. Cl.
*G06T 7/33* (2017.01)

(52) U.S. Cl.
CPC .... *G06T 7/337* (2017.01); *G06T 2207/10028* (2013.01)

(58) Field of Classification Search
CPC ....................... G06T 7/337; G06T 2207/10028
See application file for complete search history.

(56) References Cited

U.S. PATENT DOCUMENTS 9,245,170 B1 * 1/2016 Nikic ................. G06K 9/00201
9,710,714 B2 * 7/2017 Chen .................... G06K 9/4628
(Continued)

FOREIGN PATENT DOCUMENTS

| CN | 103295239 A | 9/2013 |
| CN | 105427317 A | 3/2016 |

(Continued)

OTHER PUBLICATIONS

Hackel et al, Fast Semantic Segmentation of 3D Point Clouds with Strongly Varying Density, ISPRS Annals of the Photogrammetry, Remote Sensing and Spatial Information Sciences, vol. III-3, 2016 XXIII ISPRS Congress, Jul. 12-19, 2016, Prague, Czech Republic, p. 177-184 (Year: 2016).*

(Continued)

*Primary Examiner* — Gregory M Desire
(74) *Attorney, Agent, or Firm* — Lathrop GPM LLP

(57) ABSTRACT

The present disclosure discloses a method and an apparatus for point cloud registration. The method includes: segmenting a source point cloud and a destination point cloud respectively into different categories of attribute features based on semantic; segmenting the source point cloud and the destination point cloud into a plurality of grids based on the attribute features; calculating a current similarity between the source point cloud and the destination point cloud based on the plurality of grids; determining whether the current similarity and a current iterative number satisfy a preset condition; when the current similarity and the current iterative number satisfy the preset condition, performing a registration on the source point cloud and the destination point cloud to obtain a registered result; and based on the registered result, adjusting a position of the source point cloud, updating the current iterative number.

18 Claims, 4 Drawing Sheets

(56) References Cited

U.S. PATENT DOCUMENTS

| | | | |
|---|---|---|---|
| 9,740,711 B2 * | 8/2017 | Akman | G06F 16/285 |
| 9,760,996 B2 * | 9/2017 | Chen | G06T 7/30 |
| 10,029,804 B1 * | 7/2018 | Chamberlain | G06T 7/194 |
| 10,475,231 B2 * | 11/2019 | Bhowmick | G06T 7/254 |
| 10,657,390 B2 * | 5/2020 | Mei | G06N 3/08 |
| 10,706,567 B2 * | 7/2020 | Wang | G06T 17/00 |
| 10,748,027 B2 * | 8/2020 | Shtok | G06K 9/00201 |
| 10,915,793 B2 * | 2/2021 | Corral-Soto | G06K 9/627 |
| 2015/0138310 A1 * | 5/2015 | Fan | G06K 9/00791 348/36 |
| 2017/0039436 A1 * | 2/2017 | Chen | G06K 9/4628 |
| 2018/0218510 A1 * | 8/2018 | Taguchi | G06T 7/337 |
| 2018/0349522 A1 * | 12/2018 | Aphek | G06F 30/13 |
| 2019/0139403 A1 * | 5/2019 | Alam | H04W 4/40 |
| 2020/0160487 A1 * | 5/2020 | Kanzawa | G06K 9/00369 |
| 2020/0342614 A1 * | 10/2020 | Yan | G06T 7/337 |

FOREIGN PATENT DOCUMENTS

| | | | |
|---|---|---|---|
| CN | 105702151 A | 6/2016 | |
| CN | 106803267 A | 6/2017 | |
| CN | 107038717 A | 8/2017 | |

OTHER PUBLICATIONS

Chinese Patent Application No. 201910334541.0 First Office Action dated Dec. 3, 2020, 6 pages.

Chinese Patent Application No. 201910334541.0 English translation of First Office Action dated Dec. 3, 2020, 5 pages.

Zaganidis, A. et al. "Integrating Deep Semantic Segmentation Into 3-D Point Cloud Registration" Jan. 1, 2018, pp. 2942-2949.

Wang et al. "A Robust Point Cloud Registration Method in Urban Dynamic Environment" Robot, vol. 40, No. 3, May 2018; pp. 257-265.

Zaganidis, A. et al. "Semantic-assisted 3D normal distributions transform for scan registration in environments with limited structure" IEEE/RSJ Int'l Conf on Intelligent Robots and Systems, Sep. 24-28, 2017, pp. 4064-4069.

Yu, F. et al. "Semantic alignment of LiDAR data at city scale" IEEE Conf on Computer Vision and Pattern Recognition, Jun. 7, 2015, pp. 1722-1731.

European Patent Application No. 20161347.8 extended Search and Opinion dated Sep. 18, 2020, 9 pages.

* cited by examiner

METHOD AND APPARATUS FOR POINT CLOUD REGISTRATION, AND COMPUTER READABLE MEDIUM

CROSS-REFERENCE TO RELATED APPLICATION

The present application is based upon and claims priority to Chinese Patent Application No. 201910334541.0, filed on Apr. 24, 2019, the contents of which are incorporated herein by reference as if set forth in their entireties.

FIELD

The present disclosure relates to a field of unmanned vehicle technologies, and more particularly to a method and an apparatus for point cloud registration, and a computer readable medium.

BACKGROUND

Point cloud registration refers to merging two pieces of point clouds describing a same scene into one piece of point cloud data without ghosting and offset through rotation and translation. In the production of a high-precision map, due to an error of a GPS (global positioning system) of an acquisition vehicle, there are different degrees of deviations among data acquired in a plurality of trips. Therefore, the point cloud registration is essential in a high-precision map. In addition, the point cloud registration is also widely used in a scene such as a 3D (three-dimensional) modeling, 3D reconstruction.

Presently, main methods for point cloud registration include the following.

1. An ICP (iterative closest point) method. In detail, for each point in a source point cloud (src), a point in a destination point cloud (dst) closest to the point is searched. A relative position between the point in the source point cloud and the point in the destination point cloud is calculated. A moving direction between the source point cloud and the destination point cloud is determined through RANSAC (random sample consensus). The above procedure is iterated until an iterative termination condition is satisfied. The computational efficiency of the ICP method is slow, especially in the high-precision map where the number of point clouds needing to be matched is in the tens of millions or hundreds of millions, the efficiency of the ICP method seriously affected. Meanwhile, the ICP method itself is sensitive to data, while collected data will be interfered by vehicles and pedestrians, which may affect a final registered result.

2. An ICP method based on features. In detail, features (such as a line feature, a surface feature and some special feature points) in two pieces point clouds are extracted firstly. A nearest neighbor search method is used to match the same features in the two pieces of point clouds. A relative relationship of the matched features is established at the same time. The two pieces of point clouds are moved based on the relative relationship. The above procedure is iterated until an iterative termination condition is satisfied. The ICP method based on features mainly focuses on the line feature and the surface feature for performing the point cloud registration. Although the registration efficiency meets the requirement, there is a strict requirement for the scene. If there is no required feature in the point cloud, the registration may not be provided.

3. Registration based on rasterized point cloud information. In detail, rasterization is performed on the source point cloud and the destination point cloud. Some statistic information of the point cloud in each grid obtained after the rasterization is recorded, such as an average height of point clouds, an average reflectance of point clouds, a height variance of point cloud, a reflectance variance of point cloud, etc. The registration is performed based on the grids under the guidance of the ICP idea. The registration based on the rasterized point cloud information has a good registration effect. However, vehicles traveling on the ground will cause interference, and there is a problem in a scene with high similarity or reflectivity failure.

SUMMARY

For the above disadvantages, the present disclosure provides a method and an apparatus for point cloud registration, and a computer readable medium.

Embodiments of the present disclosure provide a method for point cloud registration. The method includes: segmenting a source point cloud into different categories of attribute features based on semantic, and segmenting a destination point cloud into different categories of the attribute features based on semantic, the attribute features including a ground feature and a non-ground feature; segmenting the source point cloud and the destination point cloud into a plurality of grids based on the attribute features; calculating a current similarity between the source point cloud and the destination point cloud based on the plurality of grids; determining whether the current similarity and a current iterative number satisfy a preset condition; in response to determining that the current similarity and the current iterative number satisfy the preset condition, performing a registration on the source point cloud and the destination point cloud to obtain a registered result; and based on the registered result, adjusting a position of the source point cloud, updating the current iterative number, and calculating an updated similarity between the destination point cloud and the source point cloud after adjusting the position.

Embodiments of the present disclosure further provide an apparatus for point cloud registration. The apparatus includes: one or more processors; a memory storing instructions executable by the one or more processors; in which the one or more processors are configured to: segment a source point cloud into different categories of attribute features based on semantic, and segment a destination point cloud into different categories of the attribute features based on semantic, the attribute features including a ground feature and a non-ground feature; segment the source point cloud and the destination point cloud into a plurality of grids based on the attribute features; calculate a current similarity between the source point cloud and the destination point cloud based on the plurality of grids; determine whether the current similarity and a current iterative number satisfy a preset condition; perform a registration on the source point cloud and the destination point cloud to obtain a registered result in response to determining that the current similarity and the current iterative number satisfy the preset condition; based on the registered result, adjust a position of the source point cloud, update the current iterative number, and calculate an updated similarity between the destination point cloud and the source point cloud after adjusting the position.

The present disclosure further provides a computer readable medium having a computer program stored thereon. A method for point cloud registration is implemented when being executed by the computer program, in which the method may include: segmenting a source point cloud into different categories of attribute features based on semantic, and segmenting a destination point cloud into different categories of the attribute features based on semantic, the attribute features comprising a ground feature and a non-ground feature; segmenting the source point cloud and the destination point cloud into a plurality of grids based on the attribute features; calculating a current similarity between the source point cloud and the destination point cloud based on the plurality of grids; determining whether the current similarity and a current iterative number satisfy a preset condition; in response to determining that the current similarity and the current iterative number satisfy the preset condition, performing a registration on the source point cloud and the destination point cloud to obtain a registered result; and based on the registered result, adjusting a position of the source point cloud, updating the current iterative number, and calculating an updated similarity between the destination point cloud and the source point cloud after adjusting the position.

DETAILED DESCRIPTION

Exemplary embodiments will be described fully below with reference to accompanying drawings. However, the exemplary embodiments may be embodied in different forms and should not be construed as a limitation of embodiments described herein. On the contrary, these embodiments are provided to enable the present disclosure thorough and complete, and to enable the skilled in the art to fully understand the scope of the present disclosure.

As used herein, terms "and/or" include any and all combinations of one or more related enumerated items.

Terms used herein are intended only to describe a specific embodiment, and are not construed to limit the present disclosure. As used herein, "a" and "the" in singular forms mean including plural forms, unless clearly indicated in the context otherwise. It should be further understood that, when used in the specification, terms "comprising" and/or "including" specify the presence of stated features, entities, steps, operations, elements and/or components, but do not exclude the presence or addition of one or more other features, entities, steps, operations, elements, components and/or groups thereof.

The embodiments described herein may be described with reference to plan and/or cross-sectional schematic diagrams by means of ideal schematic diagrams of the present disclosure. Therefore, the exemplary diagram may be modified according to manufacturing techniques and/or tolerances. Embodiments are not limited to the embodiments illustrated in the accompanying drawings, but include modifications of configurations formed based on manufacturing processes. A region illustrated in the accompanying drawings has a schematic attribute, and a shape of the region illustrated in the accompanying drawings illustrates a specific shape of the region of an element, but are not intended to limit thereto.

Unless otherwise defined, all terms (including technical and scientific terms) used herein have the same meaning as commonly understood by the skilled in the art. It should be understood that, the term such as that defined in a commonly used dictionary should be interpreted as having a meaning consistent with its meaning in the context of the related art and the present disclosure, and will not be interpreted as having an idealized or overly formal meaning unless explicitly defined herein.

Presently, an average recall rate of point clouds based on semantic segmentation is about 95%. The present disclosure provides a method for point cloud registration in combination with a method for performing semantic segmentation on a point cloud and a method for performing rasterization on the point cloud, and pointedly provides a matching strategy and a similarity evaluation strategy.

Figure 1:
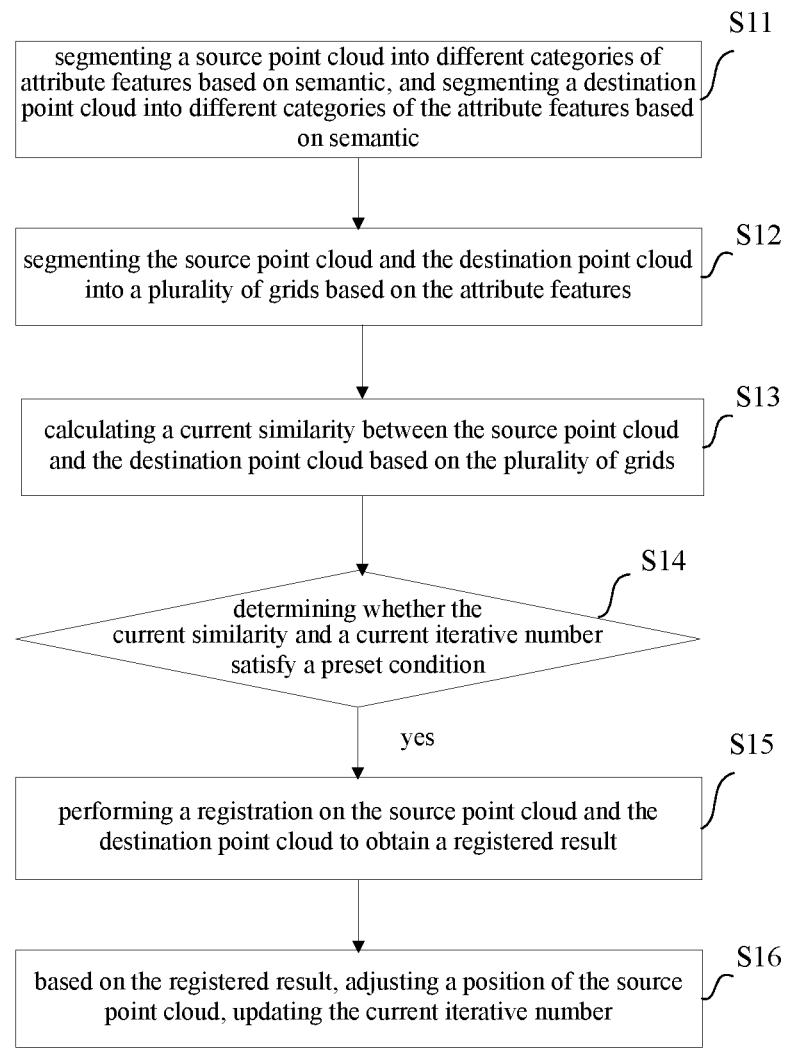
FIG. 1 illustrates a flow chart of a method for point cloud registration according to an embodiment of the present disclosure.

An embodiment of the present disclosure provides a method for point cloud registration. Detailed description will be made below to the method for the point cloud registration with reference to FIG. 1. As illustrated in FIG. 1, the method includes the following.

At block S11, a source point cloud is segmented into different categories of attribute features based on semantic, and a destination point cloud is segmented into different categories of the attribute features based on semantic.

In detail, the attribute features include a ground feature and a non-ground feature. Categories of the ground feature may include ground, a lane line, etc. Categories of the non-ground feature may include a guardrail, a curb, a signpost, a rod-shaped object, a viaduct, etc.

The actions at this block are used for semantic segmentation. The detailed implementation for distinguishing the attribute features of the point cloud based on the semantic according to the categories belongs to the related art, which is not elaborated herein.

At block S12, the source point cloud and the destination point cloud are segmented into a plurality of grids based on the attribute features.

The further away the point clouds, the rarer and sparser the point clouds. Therefore, in embodiments of the present disclosure, a specified grid size is 60 m*60 m. The point cloud may include noise interference from a car, a pedestrian and the like. Therefore, in order to ensure the accuracy for point cloud registration, a point cloud of the noise may not be placed in the grid during performing the rasterization on the point cloud.

Content of each grid is defined as follows:
cell{
cell.base_box_info
cell.ground_box_info cell.barrier_info
...
} where box_info may include parameters of the attribute feature, such as a length, a width, a height, an average height, an average reflectivity and the like.

Each grid may include one or more attribute features (i.e., a box). It should be noted that, when an actual area of points in the point cloud is less than 50% of an area of the grid, a size of the attribute feature corresponding to the points is subject to the actual area, and the value of box_info needs to be modified accordingly. For example, when one grid includes three categories of attribute features, such as a guardrail, a ground and a light pole, and the size of the grid is 3 m*3 m, the guardrail is taken as a box, the ground is taken as a box, and the light pole is taken as a box. When an area of points of the light pole in the point cloud is 0.5 m*0.5 m, an area of points of the ground in the point cloud is 3 m*3 m, and an area of points of the guardrail in the point cloud is 3 m*0.5 m, the size of the box of the light pole and the size of the box of the guardrail are adjusted to the actual size.

The actions at this block are to perform rasterization on the point cloud. The detailed implementation for performing the rasterization on the point cloud is the same as that in the related art, which is not elaborated herein.

At block S13, a current similarity between the source point cloud and the destination point cloud is calculated based on the plurality of grids.

In detail, the current similarity between the source point cloud and the destination point cloud may be calculated based on attribute features of the plurality of grids. A procedure for calculating the current similarity between the source point cloud and the destination point cloud will be described with reference to FIG. 5.

At block S14, it is determined whether the current similarity and a current iterative number satisfy a preset condition. When it is determined that the current similarity and the current iterative number satisfy the preset condition, actions at block S15 are executed.

In detail, when the current similarity and a current iterative number satisfy the preset condition, a current relative position of the source point cloud and the destination point cloud meets a requirement. An operation for the point cloud registration may further be proceeded (that is, executing actions at block S15 and subsequent actions).

The procedure for determining whether the current similarity and the current iterative number satisfy the preset condition will be described in detail below with reference to FIG. 2.

At block S15, a registration is performed on the source point cloud and the destination point cloud to obtain a registered result.

In detail, the registered result includes a displacement to be moved. In other words, the displacement to be moved of the source point cloud may be calculated through the actions at the block.

Figure 3:
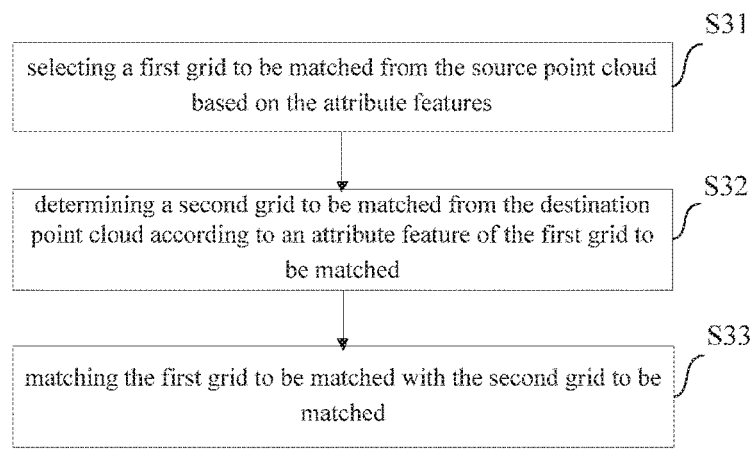
FIG. 3 illustrates a flow chart of a registration procedure according to an embodiment of the present disclosure.

A detailed procedure for performing the registration on the source point cloud and the destination point cloud will be described in detail below with reference to FIG. 3.

At block S16, based on the registered result, a position of the source point cloud is adjusted, and the current iterative number is updated.

In detail, the position of the source point cloud is moved according to the displacement to be moved, the current iteration is end, and 1 is added to the current iterative number. By setting an upper limitation of the iterative number to a reasonable value, the iteration procedure may be optimized, and the calculation efficiency and the accuracy are also improved. Preferably, the upper limitation of the iterative number may be set to 50.

It should be noted that, the procedure for the point cloud registration is the iteration procedure. The actions at this block are completed, and the iteration procedure is completed for one time. Then actions at block S13 are returned to, the actions for calculating the current similarity between the definition point cloud and the source point cloud after moving the position are executed again, the actions for determining whether the current similarity and the current iterative number satisfy the preset condition are executed again, and the actions for a next iteration are executed.

It may be seen from the actions at blocks S11-S16 that, with the present disclosure, semantic segmentation and rasterization are combined to be performed on the point cloud, more abundant feature information except the height and the reflectivity in the point cloud is provided due to diversity of the attribute features of the point cloud, and different registration solution may be employed for different attribute features, thereby improving the matching accuracy. On the one hand, taking the attribute feature as the basis of registration may also improve the matching accuracy for some strong feature scenes with less point cloud data. On the other hand, semantic segmentation may also remove noise matching the interference from the vehicle, the pedestrian and the like, further improving the matching accuracy. For a scene with a large error (greater than 5 m) of collected data, the effect of the point cloud registration is particularly obvious by employing the solution of embodiments of the present disclosure.

The procedure for determining whether the current similarity and the current iterative number satisfy the preset condition will be described in detail below with reference to FIG. 1 and FIG. 2. As illustrated in FIG. 1 and FIG. 2, after the actions at block S13 are executed, the actions for determining whether the current similarity and the current iterative number satisfy the preset condition are executed. The actions include the following.

At block S21, the current similarity is compared with a first preset threshold, and the current iterative number is compared with a second preset threshold. Actions at block S22 are executed when the current similarity is smaller than or equal to the first threshold, and the current iterative number is less than the second threshold.

In detail, when it is determined that the current similarity is smaller than or equal to the first threshold, and the current iterative number is smaller than the second threshold, the current similarity does not satisfy the requirement. That is, a current location of the source point cloud is not optimal, there is a need to continue to adjust the position of the source point cloud, and the upper limitation of the iteration number is not reached. Therefore, the current similarity is further compared with a previously calculated similarity (that is, the actions at block S22 are executed).

At block S22, the current similarity is compared with the previously calculated similarity. When the current similarity is greater than the previously calculated similarity, actions at block S15 are executed. When the current similarity is smaller than or equal to the previously calculated similarity, actions at block S23 are executed.

In detail, when it is determined that the current similarity is greater than the previously calculated similarity, the current similarity satisfies the preset condition. In other words, although the current similarity does not reach the requirement (that is, the current similarity is not greater than the first threshold), the current similarity is improved comparing with the previously calculated similarity. Therefore, the procedure for the point cloud registration may be continued (that is, actions at block S15 and subsequent actions are executed).

When it is determined that the current similarity is less than or equal to the previously calculated similarity, a previously adjustment for the position of the source point cloud is not reasonable, thereby causing a greater difference between the destination point cloud and the source point cloud after moving. Under this condition, a position of the source point cloud needs to be set back, a grid to be matched is selected from the source point cloud, such that the registration is performed on the source point cloud and the destination point cloud again (that is, actions at block S15 and subsequent actions are executed).

At block S23, the position of the source point cloud is set back.

It may be seen from actions at block S21-S23 that, by setting the preset condition, it is determined whether the current similarity satisfies the requirement and whether the current iterative number reaches the upper limitation. When the current similarity does not satisfy the requirement and the current iterative number does not reach the upper limitation, it is determined whether the current similarity is improved comparing with the previously adjustment for the position of the source point cloud. When the previously calculated similarity between the source point cloud and the destination point cloud is improved after the previously adjustment for the position of the source point cloud, it means that the previously adjustment for the position of the source point cloud is corrected, and the point cloud registration may further be performed, such that the position of the source point cloud is further adjusted. If the similarity is decreased after the previously adjustment for the position of the source point cloud, the previously adjustment for the position of the source point cloud is wrong. Therefore, the position of the source point cloud is set back, and the point cloud registration is re-executed, such that the position of the source point cloud is readjusted, thereby ensuring the accuracy of the subsequent adjustment for the position of the source point cloud.

Figure 2:
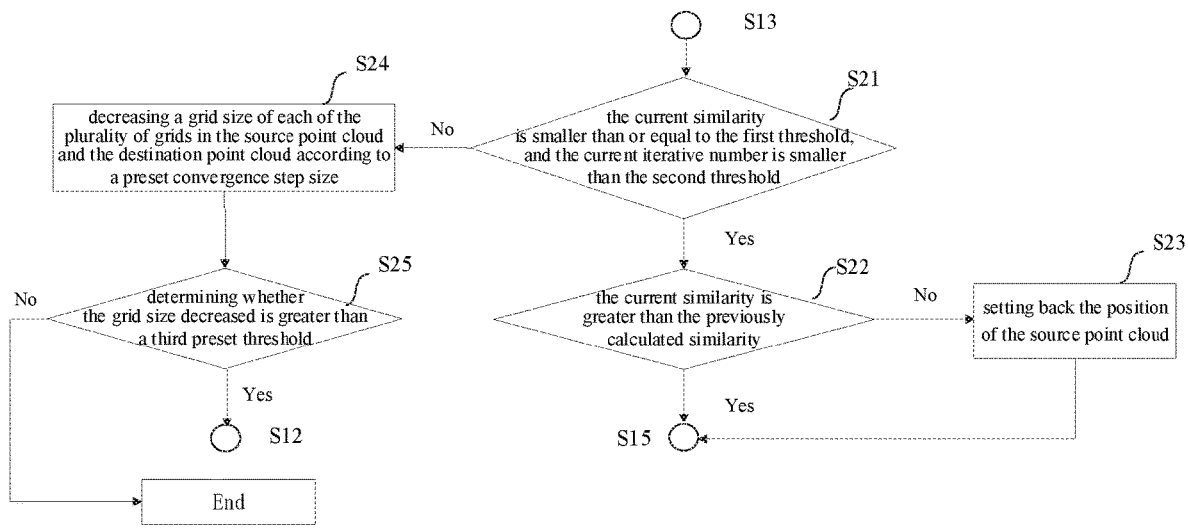
FIG. 2 illustrates a flow chart of a method for point cloud registration according to another embodiment of the present disclosure.

Further, as illustrated in FIG. 1 and FIG. 2, the method further includes the following.

At block S21, when the current similarity is greater than the first threshold, or the current iterative number is greater than or equal to the second threshold, the action at block S24 is executed.

At block S24, a grid size of each of the plurality of grids is decreased according to a preset convergence step size.

At block S25, it is determined whether the decreased grid size is greater than a third preset threshold. In response to determining that the decreased grid size is greater than the third preset threshold, actions at block S12 are executed. Otherwise, the procedure is end.

The third threshold is a minimum grid size. When the decreased grid size is greater than the third threshold, the decreased grid size is not the minimum grid size. Then rasterization may be performed again according to the decreased grid size, and similarity determination and point cloud registration may be performed again (that is, actions at block S12 and subsequent actions of the actions at block S12 are executed). In detail, at block S12, based on the decreased grid size, the source point cloud and the destination point cloud are segmented into a plurality of grids according to the attribute features.

When the decreased grid size is smaller than or equal to the third threshold, the decreased grid size is smaller than the minimum grid size. At this time, either the current similarity reaches the requirement (i.e., the current similarity is greater than the first threshold), or the iterative number reaches the upper limitation before the grid is decreased. In this case, in order to save computational power, the procedure directly ends.

It may be seen from actions at block S24-S25 that, with the present disclosure, coarse registration is performed by using a larger grid firstly, and then the grid size is gradually decreased for performing a finer registration, thereby improving the efficiency of the point cloud registration.

A procedure for performing the registration on the source point cloud and the destination point cloud will be described in detail below with reference to FIG. 3. As illustrated in FIG. 3, the procedure for performing the registration on the source point cloud and the destination point cloud includes the following.

At block S31, a first grid to be matched is selected from the source point cloud based on the attribute feathers.

In detail, the point cloud includes a plurality of categories of ground features and non-ground features, and the solution for the point cloud registration in the present disclosure is performed based on the category of the attribute feature. Therefore, there is a need to select the category of the attribute feature to be matched at this block.

Preferably, the first grid to be matched may be selected from the source point cloud according to a preset attribute feature priority. An order of attribute feature priorities from high to low is: a grid including the ground feature and all the non-ground features, a grid including the ground feature and the guardrail feature, and a grid including the ground feature and the brand-pole feature. Based on the order of the attribute feature priorities, the grid to be matched is selected, which may reduce the matching difficulty and improve the matching efficiency.

At block S32, a second grid to be matched is determined from the destination point cloud according to an attribute feather of the first grid to be matched.

When the first grid to be matched includes the ground feature only, grids are selected from the destination point cloud, and a distance between each grid selected and the first grid to be matched is smaller than a preset fourth threshold value. A matching degree between each grid selected and the first grid to be matched is calculated. A grid with the highest matching degree is selected as the second grid to be matched.

In detail, when the first grid to be matched only includes the ground feature only and does not include the non-ground feature, the matching degree $S_h$ is calculated by a formula of:

$$S_h = e^{-\frac{(\overline{h_s} - \overline{h_d})^2}{\Delta h_{thr}^2}} \quad (1)$$

where, $\overline{h_s}$ represents an average height of respective ground features in the first grid to be matched in the source point cloud, $\overline{h_d}$ represents an average height of respective ground features in a set of grids in the destination point cloud, in which a distance between each of the set of grids and the first grid to be registered is smaller than the fourth preset threshold, and $\Delta h_{thr}$ represents a preset value.

In other words, for each first grid to be matched in the source point cloud, grids are selected from the destination point cloud, and the distance between each selected grid and the first grid to be matched is smaller than the preset fourth threshold value (for example, the fourth threshold value may be set as 50 m). The matching degree $S_h$ between each selected grid and the first grid to be matched is calculated based on the formula (1), and a grid with the highest matching degree $S_h$ is determined as the second grid to be matched in the destination point cloud.

When the first grid to be matched comprises the non-ground feature only, or the first grid to be matched includes the ground feature and the non-ground feature, grids are selected from the destination point cloud, in which an attribute feature of each selected grid is the same as the attribute feature of the first gird to be matched, and a distance between the selected grid and the first grid to be matched is smaller than the fourth preset threshold, a matching degree between each selected grid and the first grid to be matched is calculated, and a grid with the highest matching degree is selected as the second grid to be matched.

In detail, when the first grid to be matched in the target source point includes the non-ground feature only and does not include the ground feature, the matching degree $S_f$ is calculated by a formula of:

$$S_f = e^{-\frac{(\overline{x_s}-\overline{x_d})^2}{\Delta x_{thr}^2} - \frac{(\overline{y_s}-\overline{y_d})^2}{\Delta y_{thr}^2} - \frac{(\overline{h_s}-\overline{h_d})^2}{\Delta h_{thr}^2}}, \quad (2)$$

where $\overline{x_s}$ represents an average value of x-axis coordinate values of respective non-ground features in the first grid to be matched, $\overline{x_d}$ represents an average value of x-axis coordinate values of respective non-ground features in a set of grids in the destination point cloud, in which a distance between each of the set of grids and the first grid to be matched is smaller than the fourth preset threshold, $\overline{y_s}$ represents an average value of y-axis coordinate values of respective non-ground features in the first grid to be matched, $\overline{y_d}$ represents an average value of y-axis coordinate values of respective non-ground features in a set of grids in the destination point cloud, in which a distance between each of the set of grids and the first grid to be matched is smaller than the fourth preset threshold, $\overline{h_s}$ represents an average height of respective ground features in the first grid to be matched in the source point cloud, $\overline{h_d}$ represents an average height of respective ground features in a set of grids in the target point cloud, in which a distance between each of the set of grids and the first grid to be matched is smaller than the fourth preset threshold, and $\Delta x_{thr}$, $\Delta y_{thr}$ and $\Delta h_{thr}$ represent preset values.

It should be noted that, the x-axis coordinate values and the y-axis coordinate values may be longitude and latitude values, or coordinate values under a universal transverse Mercator (UTM) grid system, or coordinate values under a Gaussian coordinate system.

In other words, for each first grid to be matched in the source point cloud, the grids are selected from the destination point cloud, in which, the attribute feature of each selected grid is the same as the attribute feature of the first gird to be matched, and the distance between the selected grid and the first grid to be registered is smaller than the fourth preset threshold (for example, the fourth threshold value may be set as 50 m). The matching degree $S_f$ between each selected grid and the first grid to be matched is calculated based on the formula (2), and a grid with the highest matching degree $S_f$ is determined as the second grid to be matched in the destination point cloud. It should be noted that, the matching degree $S_f$ should be greater than 0 and smaller than 1. When $S_f < S_{thr}$, $S_f = -1$. In this way, when the grid with the highest matching degree $S_f$ is selected, the grid with the matching degree $S_f$ is not selected. $S_{thr}$ is a preset value, and optimal selection value is 0.75.

When the first grid to be matched includes the ground feature and the non-ground feature, the matching degree $S_{fh}$ is calculated by a formula of:

$$S_{fh} = S_h + S_f = e^{-\frac{(\overline{h_s}-\overline{h_d})^2}{h_{thr}^2}} + e^{-\frac{(\overline{x_s}-\overline{x_d})^2}{\Delta x_{thr}^2} - \frac{(\overline{y_s}-\overline{y_d})^2}{\Delta y_{thr}^2} - \frac{(\overline{h_s}-\overline{h_d})^2}{\Delta h_{thr}^2}}. \quad (3)$$

In other words, for the ground feature, the matching degree $S_h$ is calculated based on the formula (1). For the non-ground feature, the matching degree $S_f$ is calculated based on the formula (2). Then a sum of the matching degrees of all attribute features in the first grid to be matched is calculated, to obtain the matching degree $S_{fh}$ of the first grid to be matched.

At block S33, the first grid to be matched is matched with the second grid to be matched.

In detail, a procedure for matching the first grid to be matched with the second grid to be matched will be described in detail below with reference to FIG. 4.

Figure 4:
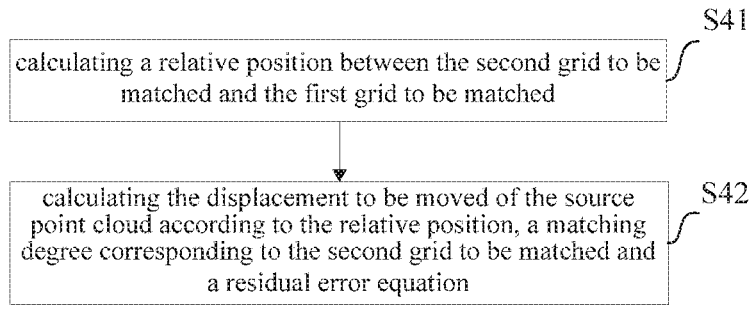
FIG. 4 illustrates a flow chart of matching a first grid to be matched with a second grid to be matched according to an embodiment of the present disclosure.

As illustrated in FIG. 4, the procedure for matching the first grid to be matched with the second grid to be matched includes the following.

At block S41, a relative position between the second grid to be matched and the first grid to be matched is calculated.

In detail, when the first grid to be matched and the second grid to be matched include the ground feature, and does not include the non-ground feature, a relative position between the second grid to be matched and the first grid to be matched is $\Delta z$, and $\Delta z = (\overline{h_s} - \overline{h_d})$.

When the first grid to be matched and the second grid to be matched include the non-ground feature, and does not include the ground feature, a relative position between the second grid to be matched and the first grid to be matched is $\Delta d$, and $\Delta d = (P_{horz}^{src} - P_{horz}^{dst}) \text{gdot}(\vec{v})$. $P_{horz}^{src}$ the position of the source point cloud, which may be represented by $\overline{x_s}$ and $\overline{y_s}$. $P_{horz}^{dst}$ is the position of the destination point cloud, which may be represented by $\overline{x_d}$ and $\overline{y_d}$. $\vec{v}$ is a main direction of horizontal movement. For a planar attribute feature (e.g., a brand, etc.), v is a normal direction of a normal vector. For a linear attribute feature (e.g., a guardrail, a curb, a pole, etc.), $\vec{v}$ is a direction perpendicular to a direction of the linear attribute feature.

When the first grid to be matched and the second grid to be matched include the ground feature and the non-ground feature, a relative position between the second grid to be matched and the first grid to be matched is $\Delta p$, and $\Delta p = \Delta z + \Delta d$.

At block S42, the displacement to be moved of the source point cloud is calculated according to the relative position, a matching degree corresponding to the second grid to be matched and a residual error equation.

In detail, the relative position between the second grid to be matched and the first grid to be matched and the matching degree corresponding to the second grid to be matched are substituted into the residual error equation, thus an optimal solution of the residual error equation is obtained as the displacement to be moved of the source point cloud. The residual error equation may be selected from a residual error equation in the related art, which is not elaborated herein.

It may be seen from actions at blocks S41-S42 that, with embodiments of the present disclosure, the registration on the source point cloud and the destination point cloud is implemented based on the attribute feature of each grid of the plurality of grids. The registration for the ground features is mainly to adjust the height, while the registration for the non-ground features is mainly to adjust the horizontal position.

Figure 5:
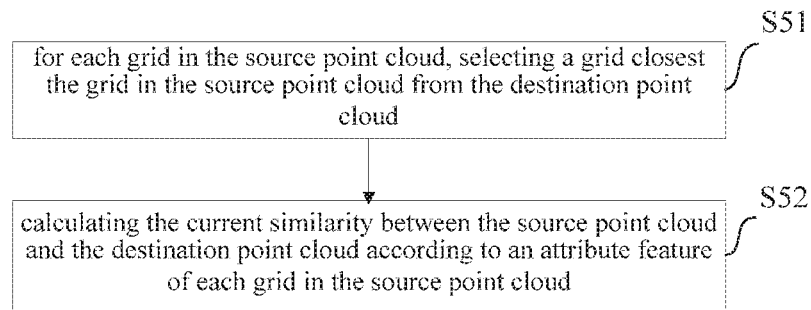
FIG. 5 illustrates a flow chart of calculating a similarity according to an embodiment of the present disclosure.

A procedure for calculating the current similarity between the source point cloud and the destination point cloud will be described in detail below with reference to FIG. 5. As illustrated in FIG. 5, the procedure includes the following.

At block S51, for each grid in the source point cloud, a grid closest the grid in the source point cloud is selected from the destination point cloud.

At block S52, the current similarity between the source point cloud and the destination point cloud is calculated according to an attribute feature of each grid in the source point cloud.

In detail, when the grid in the source point cloud includes the ground feature only, and does not include the non-ground feature, the similarity of the grid may be calculated based on the formula (1), which is not elaborated herein.

When the grid in the source point cloud includes the non-ground feature only, and does not include the ground feature, the similarity of the grid may be calculated based on the formula (2), which is not elaborated herein.

When the grid in the source point cloud includes the non-ground feature and the ground feature, the similarity of the grid may be calculated based on the formula (3), which is not elaborated herein.

After the similarity of each grid is obtained, similarities of all grids in the point cloud are synthesized to obtain the similarity between the source point cloud and the destination point cloud. For example, the similarity between the source point cloud and the destination point cloud may be obtained by calculating the average value of the similarities of all grids.

Figure 6:
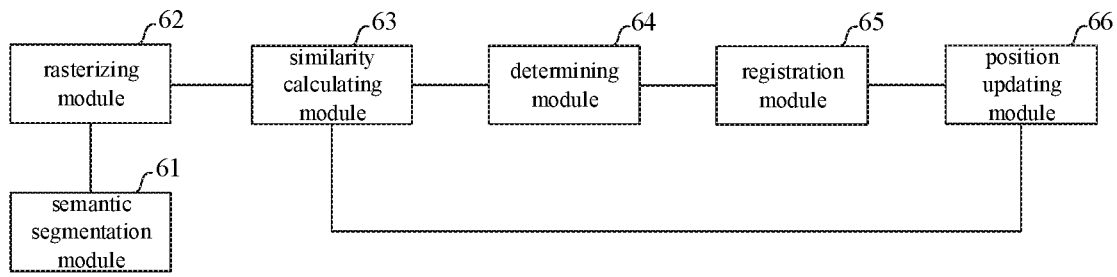
FIG. 6 illustrates a block diagram of an apparatus for point cloud registration according to an embodiment of the present disclosure.

Based on the same technical concept, embodiments of the present disclosure further provide an apparatus for point cloud registration. As illustrated in FIG. 6, the apparatus includes: a semantic segmentation module 61, a rasterizing module 62, a similarity calculating module 63, a determining module 64, a registration module 65, and a position updating module 66.

The semantic segmentation module 61 is configured to segment a source point cloud into different categories of attribute features based on semantic, and to segment a destination point cloud into different categories of the attribute features based on semantic, the attribute features including a ground feature and a non-ground feature.

The rasterizing module 62 is configured to segment the source point cloud and the destination point cloud into a plurality of grids based on the attribute features.

The similarity calculating module 63 is configured to calculate a current similarity between the source point cloud and the destination point cloud based on the plurality of grids.

The determining module 64 is configured to determine whether the current similarity and a current iterative number satisfy a preset condition.

The registration module 65 is configured to perform a registration on the source point cloud and the destination point cloud to obtain a registered result when the determining module 64 determines that the current similarity and the current iterative number satisfy the preset condition.

The position updating module 66 is configured to: based on the registered result, adjust a position of the source point cloud, update the current iterative number, and calculate an updated similarity between the destination point cloud and the source point cloud after adjusting the position.

Preferably, the determining module 64 is configured to compare the current similarity with a first preset threshold, and to compare the current iterative number with a second preset threshold; and to compare the current similarity with a previously calculated similarity when the determining module determines that the current similarity is smaller than or equal to the first threshold, and the current iterative number is smaller than the second threshold.

The preset condition includes: the current similarity being greater than the previously calculated similarity.

Figure 7:
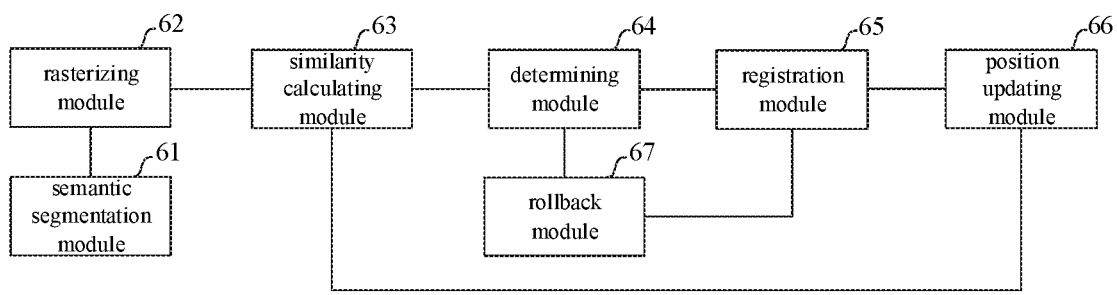
FIG. 7 illustrates a block diagram of an apparatus for point cloud registration according to another embodiment of the present disclosure.

In another embodiment of the present disclosure, as illustrated in FIG. 7, the apparatus further includes a rollback module 67. The rollback module 67 is configured to set back the position of the source point cloud when the determining module 64 determines that the current similarity is smaller than or equal to the previously calculated similarity.

The registration module 65 is configured to register the source point cloud and the destination point cloud after the rollback module 67 sets back the position of the source point cloud.

Figure 8:
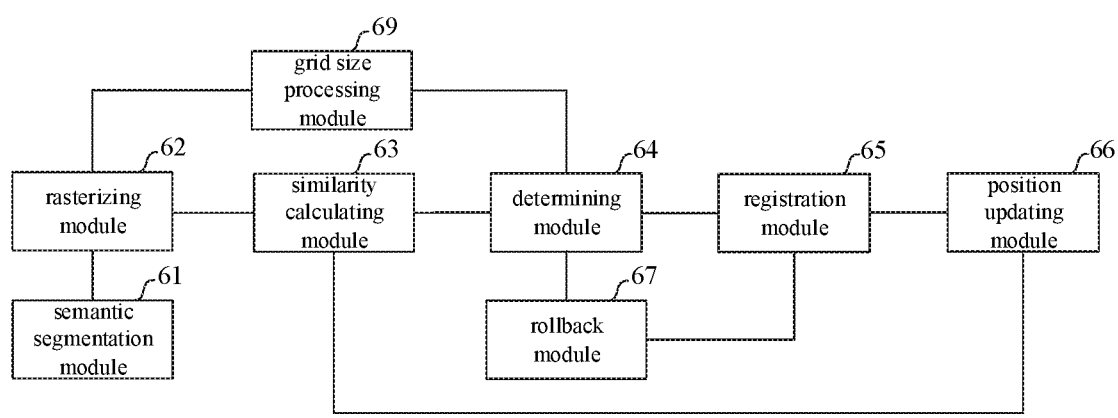
FIG. 8 illustrates a block diagram of an apparatus for point cloud registration according to an embodiment of the present disclosure.

In another embodiment of the present disclosure, as illustrated in FIG. 8, the apparatus further includes a grid size processing module 69. The grid size processing module 69 is configured to decrease a grid size of each of the plurality of grids according to a preset convergence step size when the determining module 64 determines that the current similarity is greater than the first threshold, or that the current iterative number is greater than or equal to the second threshold.

The determining module 64 is further configured to determine whether the grid size decreased is greater than a third preset threshold after the grid size processing module 69 decreases the grid size of each of the plurality of grids according to the preset convergence step size.

The registration module 62 is further configured to, after the grid size processing module 69 determines that the grid size decreased is greater than the third preset threshold, based on the grid size decreased, segment the source point cloud and the destination point cloud into a plurality of grids according to the attribute features.

Preferably, the similarity calculating module 63 is configured to calculate the current similarity between the source point cloud and the destination point cloud based on the attribute features of the plurality of grids.

Preferably, the similarity calculating module 63 is configured to: for each grid in the source point cloud, select a grid closest the grid in the source point cloud from the destination point cloud; and calculate the current similarity between the source point cloud and the destination point cloud according to an attribute feature of each grid in the source point cloud.

Figure 9:
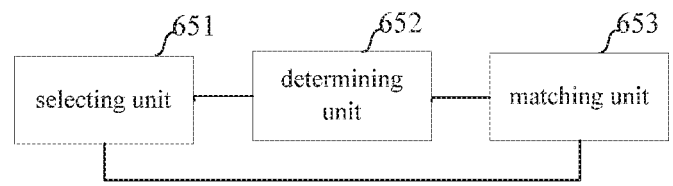
FIG. 9 illustrates a block diagram of a registration module according to an embodiment of the present disclosure.

As illustrated in FIG. 9, preferably, the registration module 65 includes a selecting unit 651, a determining unit 652 and a matching unit 653.

The selecting unit 651 is configured to select a first grid to be matched from the source point cloud based on the attribute features.

The determining unit 652 is configured to determine a second grid to be matched from the destination point cloud according to an attribute feature of the first grid to be matched.

The matching unit 653 is configured to match the first grid to be matched with the second grid to be matched.

Preferably, the determining unit 652 is configured to: when the first grid to be matched includes the ground feature only, select grids from the destination point cloud, a distance between each grid selected and the first grid to be matched being smaller than a preset fourth threshold value, calculate a matching degree between each grid selected and the first grid to be matched, and select a grid with the highest matching degree as the second grid to be matched; and when the first grid to be matched includes the non-ground feature only, or the first grid to be matched includes the ground feature and the non-ground feature, select grids from the destination point cloud, an attribute feature of each grid selected being the same as the attribute feature of the first gird to be matched, and a distance between the grid selected and the first grid to be matched being smaller than the fourth preset threshold, calculate a matching degree between each grid selected and the first grid to be matched, and select a grid with the highest matching degree as the second grid to be matched.

Preferably, the determining unit 652 is configured to: when the first grid to be matched includes the ground feature only, calculate the matching degree by a formula of:

$$S_h = e^{-\frac{(\overline{h_s} - \overline{h_d})^2}{\Delta h_{thr}^2}} \quad (1)$$

where, $\overline{h_s}$ represents an average height of respective ground features in the first grid to be matched in the source point cloud, $\overline{h_d}$ represents an average height of respective ground features in a set of grids in the destination point cloud, in which a distance between each of the set of grids and the first grid to be registered is smaller than the fourth preset threshold, and $\Delta h_{thr}$ represents a preset value;

when the first grid to be matched includes the non-ground feature only, calculate the matching degree by a formula of:

$$S_f = e^{-\frac{(\overline{x_s} - \overline{x_d})^2}{\Delta x_{thr}^2} - \frac{(\overline{y_s} - \overline{y_d})^2}{\Delta y_{thr}^2} - \frac{(\overline{h_s} - \overline{h_d})^2}{\Delta h_{thr}^2}} \quad (2)$$

where, $\overline{x_s}$ represents an average value of x-axis coordinate values of respective non-ground features in the first grid to be matched, $\overline{x_d}$ represents an average value of x-axis coordinate values of respective non-ground features in a set of grids in the destination point cloud, in which a distance between each of the set of grids and the first grid to be matched is smaller than the fourth preset threshold, $\overline{y_s}$ represents an average value of y-axis coordinate values of respective non-ground features in the first grid to be matched, $\overline{y_d}$ represents an average value of y-axis coordinate values of respective non-ground features in a set of grids in the destination point cloud, in which a distance between each of the set of grids and the first grid to be matched is smaller than the fourth preset threshold, $\overline{h_s}$ represents an average height of respective ground features in the first grid to be matched in the source point cloud, $\overline{h_d}$ represents an average height of respective ground features in a set of grids in the target point cloud, in which a distance between each of the set of grids and the first grid to be matched is smaller than the fourth preset threshold, and $\Delta x_{thr}$, $\Delta y_{thr}$ and $\Delta h_{thr}$ represent preset values; and when the first grid to be registered includes the ground feature and the non-ground feature, calculate the matching degree by a formula of:

$$S_{fh} = S_h + S_f \quad (3).$$

Preferably, the registered result includes: a displacement to be moved. The matching unit is configured to calculate a relative position between the second grid to be matched and the first grid to be matched; and to calculate the displacement to be moved of the source point cloud according to the relative position, a matching degree corresponding to the second grid to be matched and a residual error equation.

The present disclosure further provides a server. The server includes one or more processors; and a storage device having one or more programs stored thereon. When the one or more programs are executed by the one or more processors, the one or more processors are caused to implement the method for point cloud registration described above.

The present disclosure further provides a computer readable medium having a computer program stored thereon. The method for point cloud registration described above is implemented when being executed by the computer program.

It should be understood by the skilled in the art that, all or some of the steps in the method disclosed above, and functional modules/units in the apparatus may be implemented as software, firmware, hardware, and appropriate combinations thereof. In a hardware implementation, the division among the functional modules/units mentioned above does not necessarily correspond to the division of physical components. For example, one physical component may have a plurality of functions, or one function or step may be performed by several physical components in cooperation. Some or all of the physical components may be implemented as software executed by a processor, such as a central processing unit, a digital signal processor, or a microprocessor, or as hardware, or as an integrated circuit, such as a specific integrated circuit. Such software may be distributed on computer readable media, which may include computer storage media (or non-transitory media) and communication media (or transitory media). As is well known to the skilled in the art, the term "computer storage medium" includes volatile and nonvolatile, removable and non-removable media implemented in any method or technology for storing information (such as computer readable instructions, data structures, program modules or other data). The computer storage media includes, but is not limited to, a RAM (random access memory), a ROM (read only memory), an EEPROM (electrically erasable programmable read-only memory), a flash memory or other memory technologies, a CD-ROM (compact disc read only memory), a DVD (digital versatile disk) or other optical disk storage, a magnetic cassette, a magnetic tape, a magnetic disk storage or other magnetic storage devices, or any other media that may be used to store desired information and may be accessed by a computer. Furthermore, it is well known to the skilled in the art that, the communication media generally includes computer readable instructions, a data structure, program modules, or other data in a modulated data signal such as a carrier wave or other transmission mechanism, and may include any information delivery medium.

Although exemplary embodiments disclosed by the present disclosure employ specific terms are, the specific terms should only be interpreted as a generic and descriptive sense and not for purposes of limitation. In some embodiments, it is apparent to the skilled in the art that, unless explicitly stated otherwise, the features, characteristics, and/or elements described in connection with a particular embodiment may be used alone, the features, characteristics, and/or elements described in connection with other embodiment may be used in combination with other embodiments. Therefore, it should be understood by the skilled in the art that various changes in form and details may be made without departing from the scope of the present disclosure in the appended claims.

What is claimed is:

1. A method for point cloud registration, comprising:
segmenting a source point cloud into different categories of attribute features based on semantic, and segmenting a destination point cloud into different categories of the attribute features based on semantic, the attribute features comprising a ground feature and a non-ground feature;
segmenting the source point cloud and the destination point cloud into a plurality of grids based on the attribute features;
calculating a current similarity between the source point cloud and the destination point cloud based on the plurality of grids;
determining whether the current similarity and a current iterative number satisfy a preset condition;
in response to determining that the current similarity and the current iterative number satisfy the preset condition, performing a registration on the source point cloud and the destination point cloud to obtain a registered result; and
based on the registered result, adjusting a position of the source point cloud, updating the current iterative number, and calculating an updated similarity between the destination point cloud and the source point cloud after adjusting the position.

2. The method of claim 1, wherein determining whether the current similarity and the current iterative number satisfy the preset condition comprises:
comparing the current similarity with a first preset threshold, and comparing the current iterative number with a second preset threshold; and
comparing the current similarity with a previously calculated similarity when the current similarity is smaller than or equal to the first threshold, and the current iterative number is smaller than the second threshold; and
wherein the preset condition comprises: the current similarity being greater than the previously calculated similarity.

3. The method of claim 2, further comprising:
when the current similarity is greater than the first threshold, or the current iterative number is greater than or equal to the second threshold, decreasing a grid size of each of the plurality of grids according to a preset convergence step size;
determining whether the grid size decreased is greater than a third preset threshold; and
in response to determining that the grid size decreased is greater than the third preset threshold, based on the grid size decreased, segmenting the source point cloud and the destination point cloud into a plurality of grids according to the attribute features.

4. The method of claim 1, further comprising:
when the current similarity is smaller than or equal to the previously calculated similarity, setting back the position of the source point cloud, and performing the registration on the source point cloud and the destination point cloud.

5. The method of claim 1, wherein calculating the current similarity between the source point cloud and the destination point cloud based on the plurality of grids comprises:
calculating the current similarity between the source point cloud and the destination point cloud based on the attribute features of the plurality of grids.

6. The method of claim 5, wherein calculating the current similarity between the source point cloud and the destination point cloud based on the attribute features of the plurality of grids comprises:
for each grid in the source point cloud, selecting a grid closest the grid in the source point cloud from the destination point cloud; and
calculating the current similarity between the source point cloud and the destination point cloud according to an attribute feature of each grid in the source point cloud.

7. The method of claim 1, wherein performing the registration on the source point cloud and the destination point cloud to obtain the registered result comprises:
selecting a first grid to be matched from the source point cloud based on the attribute features;
determining a second grid to be matched from the destination point cloud according to an attribute feature of the first grid to be matched; and
matching the first grid to be matched with the second grid to be matched.

8. The method of claim 7, wherein determining the second grid to be matched in the destination point cloud according to the attribute feature of the first grid to be matched comprises:
when the first grid to be matched comprises the ground feature only, selecting grids from the destination point cloud, a distance between each grid selected and the first grid to be matched being smaller than a preset fourth threshold value, calculating a matching degree between each grid selected and the first grid to be matched, and selecting a grid with the highest matching degree as the second grid to be matched; and
when the first grid to be matched comprises the non-ground feature only, or the first grid to be matched comprises the ground feature and the non-ground feature, selecting grids from the destination point cloud, an attribute feature of each grid selected being the same as the attribute feature of the first gird to be matched, and a distance between the grid selected and the first grid to be matched being smaller than the fourth preset threshold, calculating a matching degree between each grid selected and the first grid to be matched, and selecting a grid with the highest matching degree as the second grid to be matched.

9. The method of claim 8, wherein when the first grid to be matched comprises the ground feature only, calculating the matching degree by a formula of:

$$S_h = e^{-\frac{(\bar{h}_s - \bar{h}_d)^2}{\Delta h_{thr}^2}}, \quad (1)$$

where, $\bar{h}_s$ represents an average height of respective ground features in the first grid to be matched in the source point cloud, $\bar{h}_d$ represents an average height of respective ground features in a set of grids in the destination point cloud, in which a distance between each of the set of grids and the first grid to be registered is smaller than the fourth preset threshold, and $\Delta h_{thr}$ represents a preset value;

when the first grid to be matched comprises the non-ground feature only, calculating the matching degree by a formula of:

$$S_f = e^{-\frac{(\overline{x_s}-\overline{x_d})^2}{\Delta x_{thr}^2} - \frac{(\overline{y_s}-\overline{y_d})^2}{\Delta y_{thr}^2} - \frac{(\overline{h_s}-\overline{h_d})^2}{\Delta h_{thr}^2}} \quad (2)$$

where, $\overline{x_s}$ represents an average value of x-axis coordinate values of respective non-ground features in the first grid to be matched, $\overline{x_d}$ represents an average value of x-axis coordinate values of respective non-ground features in a set of grids in the destination point cloud, in which a distance between each of the set of grids and the first grid to be matched is smaller than the fourth preset threshold, $\overline{y_s}$ represents an average value of y-axis coordinate values of respective non-ground features in the first grid to be matched, $\overline{y_d}$ represents an average value of y-axis coordinate values of respective non-ground features in a set of grids in the destination point cloud, in which a distance between each of the set of grids and the first grid to be matched is smaller than the fourth preset threshold, $\overline{h_s}$ represents an average height of respective ground features in the first grid to be matched in the source point cloud, $\overline{h_d}$ represents an average height of respective ground features in a set of grids in the target point cloud, in which a distance between each of the set of grids and the first grid to be matched is smaller than the fourth preset threshold, and $\Delta x_{thr}$, $\Delta y_{thr}$ and $\Delta h_{thr}$ represent preset values; and when the first grid to be registered comprises the ground feature and the non-ground feature, calculating the matching degree by a formula of:

$$S_{fh} = S_h + S_f \quad (3).$$

10. The method of claim 7, wherein the registered result comprises: a displacement to be moved; and matching the first grid to be matched with the second grid to be matched comprises:
    calculating a relative position between the second grid to be matched and the first grid to be matched; and
    calculating the displacement to be moved of the source point cloud according to the relative position, a matching degree corresponding to the second grid to be matched and a residual error equation.

11. An apparatus for point cloud registration, comprising:
one or more processors;
a memory storing instructions executable by the one or more processors;
wherein the one or more processors are configured to:
segment a source point cloud into different categories of attribute features based on semantic, and segment a destination point cloud into different categories of the attribute features based on semantic, the attribute features comprising a ground feature and a non-ground feature;
segment the source point cloud and the destination point cloud into a plurality of grids based on the attribute features;
calculate a current similarity between the source point cloud and the destination point cloud based on the plurality of grids;
determine whether the current similarity and a current iterative number satisfy a preset condition; and
perform a registration on the source point cloud and the destination point cloud to obtain a registered result when the determining module determines that the current similarity and the current iterative number satisfy the preset condition; and
based on the registered result, adjust a position of the source point cloud, update the current iterative number, and calculate an updated similarity between the destination point cloud and the source point cloud after adjusting the position.

12. The apparatus of claim 11, wherein the one or more processors are configured to compare the current similarity with a first preset threshold, and to compare the current iterative number with a second preset threshold; and to compare the current similarity with a previously calculated similarity when the current similarity is smaller than or equal to the first threshold, and the current iterative number is smaller than the second threshold; and
the preset condition comprises:
the current similarity being greater than the previously calculated similarity.

13. The apparatus of claim 12, wherein the one or more processors are configured to set back the position of the source point cloud when the determining module determines that the current similarity is smaller than or equal to the previously calculated similarity, and
the one or more processors are configured to register the source point cloud and the destination point cloud after the rollback module sets back the position of the source point cloud.

14. The apparatus of claim 12, wherein the one or more processors are configured to decrease a grid size of each of the plurality of grids according to a preset convergence step size when the determining module determines that the current similarity is greater than the first threshold, or that the current iterative number is greater than or equal to the second threshold;
the one or more processors are further configured to determine whether the grid size decreased is greater than a third preset threshold after the grid size processing module decreases the grid size of each of the plurality of grids according to the preset convergence step size; and
the one or more processors are further configured to, after the grid size processing module determines the grid size decreased is greater than the third preset threshold, based on the grid size decreased, segment the source point cloud and the destination point cloud into a plurality of grids according to the attribute features.

15. The apparatus of claim 11, wherein the one or more processors are configured to calculate the current similarity between the source point cloud and the destination point cloud based on the attribute features of the plurality of grids.

16. The apparatus of claim 15, wherein the one or more processors are configured to: for each grid in the source point cloud, select a grid closest the grid in the source point cloud from the destination point cloud; and calculate the current similarity between the source point cloud and the destination point cloud according to an attribute feature of each grid in the source point cloud.

17. The apparatus of claim 11, wherein the one or more processors are further configured to:
select a first grid to be matched from the source point cloud based on the attribute features;
determine a second grid to be matched from the destination point cloud according to an attribute feature of the first grid to be matched; and
match the first grid to be matched with the second grid to be matched.

18. A non-transitory computer readable medium having a computer program stored thereon, wherein a method for point cloud registration is implemented when being executed by the computer program, and the method comprises:

segmenting a source point cloud into different categories of attribute features based on semantic, and segmenting a destination point cloud into different categories of the attribute features based on semantic, the attribute features comprising a ground feature and a non-ground feature;

segmenting the source point cloud and the destination point cloud into a plurality of grids based on the attribute features;

calculating a current similarity between the source point cloud and the destination point cloud based on the plurality of grids;

determining whether the current similarity and a current iterative number satisfy a preset condition;

in response to determining that the current similarity and the current iterative number satisfy the preset condition, performing a registration on the source point cloud and the destination point cloud to obtain a registered result; and based on the registered result, adjusting a position of the source point cloud, updating the current iterative number, and calculating an updated similarity between the destination point cloud and the source point cloud after adjusting the position.

* * * * *